United States Patent Office.

ROBERT W. SCHEDLER, OF BROOKLYN, ASSIGNOR TO THE NEW YORK TARTAR COMPANY, OF NEW YORK, N. Y.

MANUFACTURE OF TARTARIC ACID.

SPECIFICATION forming part of Letters Patent No. 455,768, dated July 14, 1891.

Application filed November 25, 1890. Serial No. 372,628. (No specimens.)

*To all whom it may concern:*

Be it known that I, ROBERT W. SCHEDLER, a citizen of the United States, residing in the city of Brooklyn, in the county of Kings and State of New York, have invented a certain new and useful Improvement in the Manufacture of Tartaric Acid, of which the following is a full, clear, and exact description.

The present invention relates, generally, to the manufacture of tartaric acid, and particularly to the treatment of solutions of tartaric acid after they have been concentrated to the point of practical crystallization in order to effect a more complete crystallization of such solutions than has heretofore been done.

Heretofore it has been customary in the manufacture of tartaric acid to form by well-known methods a tartrate of lime, which is decomposed by the addition of sulphuric acid to produce sulphate of lime and a solution of tartaric acid. This solution is concentrated by evaporation, generally by boiling, until the point of practical crystallization is reached, when it is drawn off into crystallizing-vats, where it is allowed to remain for several days and a portion of the tartaric acid is formed into crystals. When this process is properly carried out and good materials are used, the proportion of crystals obtained is about thirty per cent. in weight of the concentrated solution subjected to crystallization. The liquor remaining after crystallization, called "mother-liquor," is subjected to subsequent repeated concentrations and crystallizations, in order to obtain as far as practicable in a crystallized state the balance of the acid remaining therein. The crystals obtained in this way are washed with water and then dissolved, the liquid being concentrated by evaporation to the point of crystallization, then again subjected to crystallization, a small quantity of bone-dust or other suitable material being used to bleach the crystals, when the product is ready for the market.

It is the object of the present invention to largely increase the quantity of crystals during the first crystallization obtainable from a given quantity of solutions of tartaric acid concentrated to the point of crystallization, and thereby save the expense and time of treating the mother-liquor by subsequent evaporations and crystallizations; and to this end my invention consists in treating solutions of tartaric acid when concentrated to the point of practical crystallization with sulphuric acid, substantially as hereinafter described and claimed.

I take a solution of tartaric acid obtained from tartrate of lime or from other sources by any of the well-known methods and concentrate it by evaporation in vacuum or other suitable pans or vessels till it reaches the point of practical crystallization, at which time it will preferably indicate a specific gravity of about 40° Baumé. I then draw this concentrated solution into crystallizing tanks or vats and mix with it a quantity of sulphuric acid, preferably of a strength of about 66° and known as "oil of vitriol." I prefer to place the oil of vitriol in the crystallizing vats and run the solution of tartaric acid upon it directly from the evaporating-vessels, as this will give sufficient agitation to cause the two compounds to be thoroughly mingled with each other. This, however, I regard as simply a convenient and economical way of mingling the compounds, which may be effected in other ways, as by drawing the solution into the vats and then adding the oil of vitriol and stirring until it becomes thoroughly mingled.

The quantity of oil of vitriol employed may be varied to a considerable extent and good results be obtained. I have, however, found that the best results in quantity of crystals are obtained by adding from five to fifteen per centum, by weight, of oil of vitriol to the concentrated solution of tartaric acid, and that these proportions have increased the quantity of crystals over sixty per cent., in weight, of the crop obtained when no sulphuric acid was used. I have also found that by the addition of less than five per centum of oil of vitriol the crop of crystals was increased over thirty per centum. I do not, therefore, wish to limit my invention to the use of any specific quantity or proportion of oil of vitriol, or sulphuric acid, but consider that any proportion which produces a material increase in the crop of crystals is within my invention.

It will be understood that the solution of tartaric acid after the sulphuric acid has been added is to remain in the vats about the usual time for crystallization, from eight to ten days being under ordinary conditions sufficient. The crystals are then removed from the vats, subjected to thorough washing to free them from any attached sulphuric acid and are dissolved. The resulting solution is then concentrated and recrystallized, a small quantity of bone-black or other suitable material being used to bleach the crystals.

The action of the sulphuric acid to produce a larger quantity of crystals under the conditions set forth is doubtless due to its great affinity for the water in the solution of tartaric acid with which it unites to form dilute sulphuric acid, leaving a corresponding proportion of tartaric acid free to crystallize.

It has been ascertained that salts of iron, aluminum, and phosphates, one or more of which are generally present in solution of tartaric acid, operate to prevent the crystallization of the acid. I have found that the addition of sulphuric acid in the proportions above set forth operates to a large extent to neutralize the influence of these salts in preventing crystallization.

The mother-liquor remaining after the first crystallization of the solution of tartaric acid treated with sulphuric acid, as above set forth, consists largely of dilute sulphuric acid, with which is mingled a considerable quantity of tartaric acid, the latter being that part of the original tartaric acid of the charge which refused to crystallize. This mother-liquor is advantageously used to treat tartrate of lime in the place of fresh dilute acid and in the usual way, the sulphuric acid of the mother-liquor acting to decompose the tartrate of lime and the tartaric acid of the mother-liquor joining the fresh tartaric-acid solution obtained to produce a new charge of tartaric acid in condition for concentration and crystallization. In this way the dilute sulphuric acid of the mother-liquor is fully utilized and the tartaric acid mingled with it is secured in condition for further economical and successful treatment, and the expense and loss attending repeated concentrations and crystallizations of the mother-liquor is saved.

What is claimed as new is—

1. The herein-described process of treating solutions of tartaric acid concentrated to the point of crystallization, which consists in adding sulphuric acid thereto, whereby the quantity of crystallized tartaric acid as the result of the first crystallization is increased.

2. The herein-described process of producing crystallized tartaric acid, which consists in treating a solution of tartaric acid concentrated to the point of crystallization with sulphuric acid, substantially as described, subjecting the mixture to crystallization, using the resultant mother-liquor to treat tartrate of lime and thus obtain a second charge of tartaric acid in solution, whereby the uncrystallized tartaric acid remaining in the mother-liquor will be secured, the dilute sulphuric acid be utilized, and a charge of tartaric acid in solution be obtained in condition for concentration and crystallization.

ROBT. W. SCHEDLER.

Witnesses:
ROBT. F. GAYLORD,
ERNEST HOPKINSON.